No. 795,302. PATENTED JULY 25, 1905.
M. PEARSON.
PLANTER.
APPLICATION FILED FEB. 1, 1905.
2 SHEETS—SHEET 2.
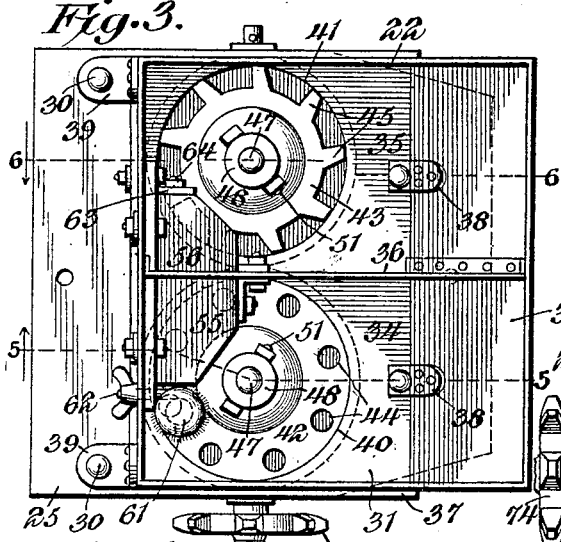
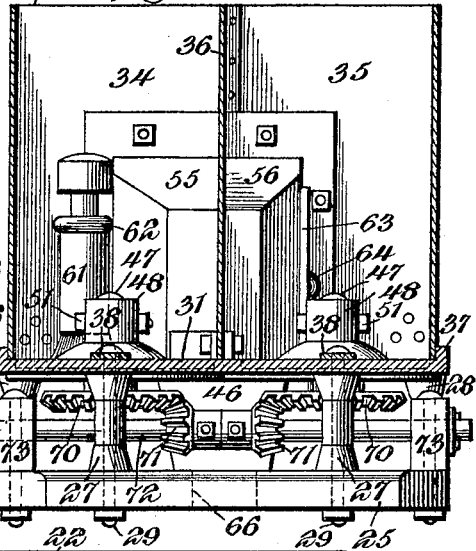
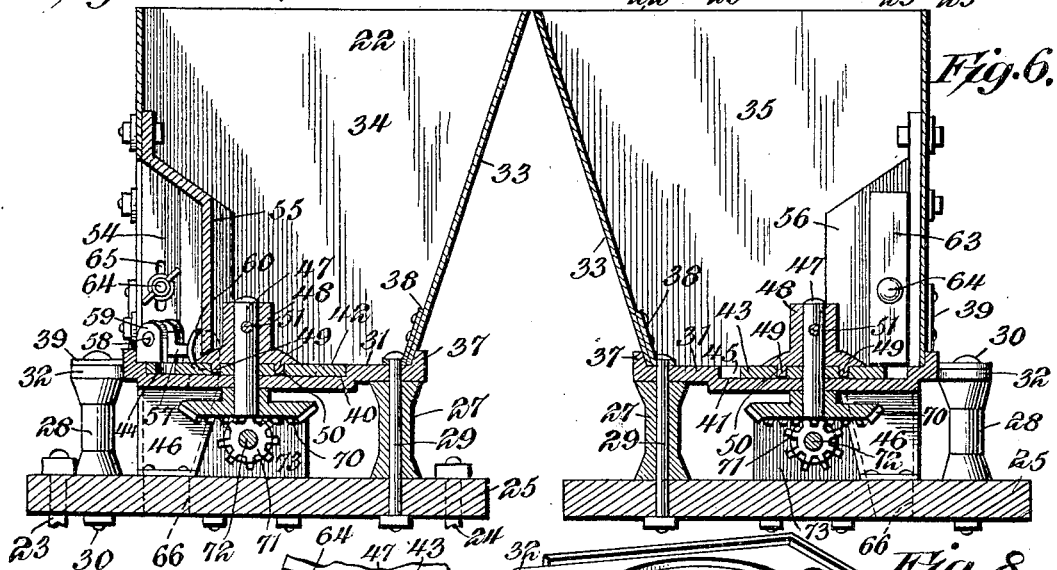
Witnesses
Howard D. Orr
N. F. Riley
Inventor
Marcus Pearson,
By E. G. Siggers
Attorney

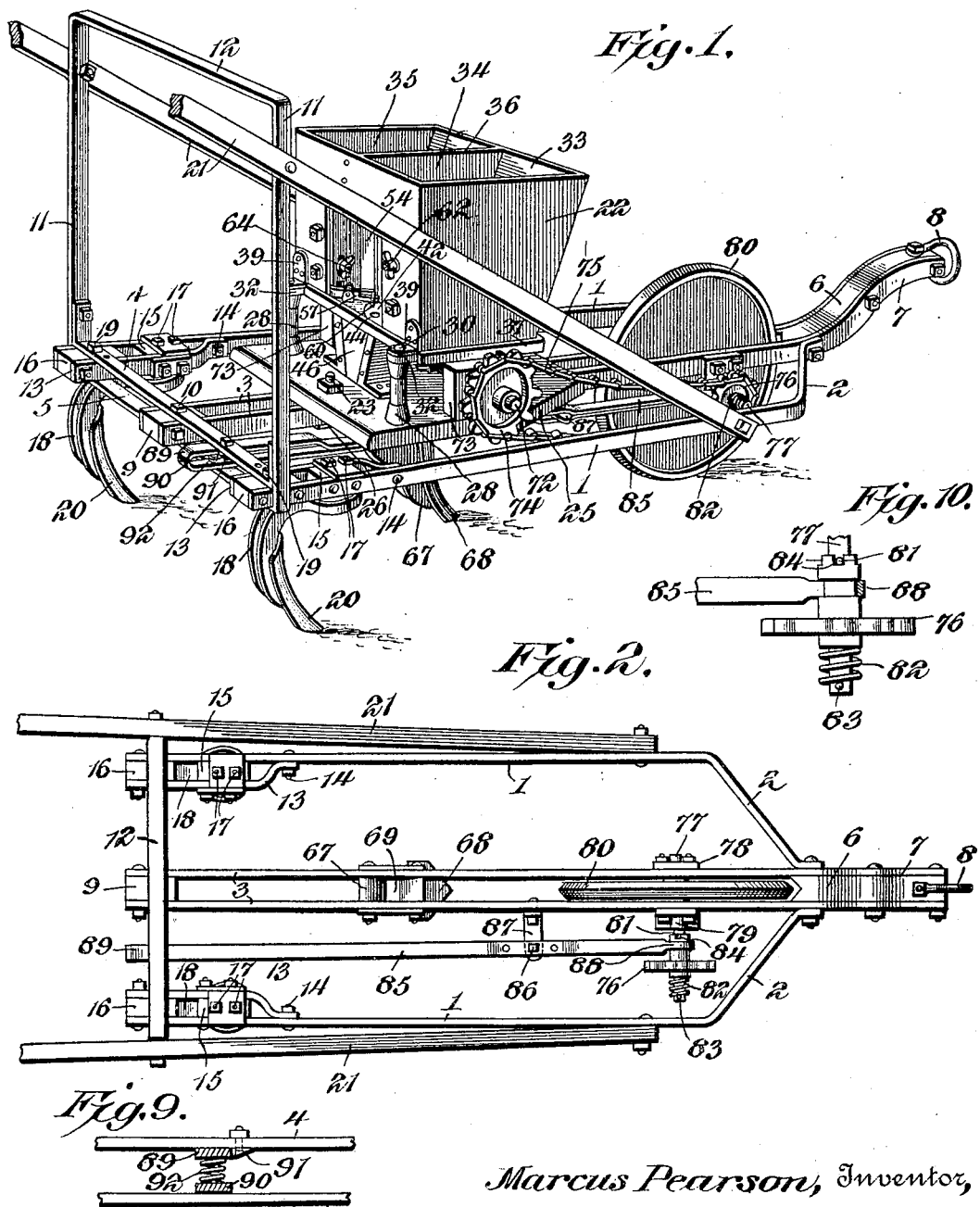

UNITED STATES PATENT OFFICE.

MARCUS PEARSON, OF SPRINGVILLE, ALABAMA.

PLANTER.

No. 795,302.　　　　Specification of Letters Patent.　　　　Patented July 25, 1905.

Application filed February 1, 1905. Serial No. 243,680.

*To all whom it may concern:*

Be it known that I, MARCUS PEARSON, a citizen of the United States, residing at Springville, in the county of St. Clair and State of Alabama, have invented a new and useful Planter, of which the following is a specification.

The invention relates to improvements in planters.

The object of the present invention is to improve the construction of planters and to provide a simple and comparatively inexpensive one designed for planting various kinds of seed and adapted to distribute fertilizer into the seed-tube simultaneously with the discharge of the seed.

A further object of the invention is to provide a planter of this character from which the hopper may be readily removed to permit different kinds of hoppers to be employed.

Another object of the invention is to enable the seed-ejecting means to be arranged exteriorly of the hopper, so that the contents thereof will not interfere with the operation of the ejecting means.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a planter constructed in accordance with this invention. Fig. 2 is a plan view of the frame of the planter, the hopper being removed. Fig. 3 is an enlarged plan view of the hopper. Fig. 4 is a transverse sectional view of the same. Fig. 5 is a longitudinal sectional view on the line 5 5 of Fig. 3. Fig. 6 is a similar view on the line 6 6 of Fig. 3. Fig. 7 is an enlarged horizontal sectional view of a portion of the hopper, illustrating the manner of mounting the seed-ejecting lever. Fig. 8 is a detail perspective view of the bottom of the hopper. Fig. 9 is a detail view of the expansible portion of the clutch-operating lever and the stop which is engaged by the same. Fig. 10 is a detail view illustrating the construction of the clutch.

Like numerals of reference designate corresponding parts in all the figures of the drawings.

1 1 designate side beams, consisting, preferably, of metal bars, having their front portions 2 extending inwardly at an angle and secured to the front portions of a pair of central beams 3. The side beams in rear of the converging front portions 2 are parallel and are connected at the rear end of the main frame of the planter by means of upper and lower transverse bars 4 and 5. The central beams or bars 3, which are parallel, are spaced apart at their front ends by a filling block or piece 6, of wood or other suitable material, the front portions of the central beams or bars 3 and the filling-piece being curved forwardly and upwardly to provide a central tongue or draft portion 7. The tongue portion 7 is provided at the front with a suitable clevis 8 for the attachment of a draft-animal. The rear ends of the central beams or bars are spaced apart by a block 9, which is secured to the central bars or beams by a transverse bolt or other suitable fastening device. The block 9 is also secured to the transverse bars 4 and 5 by a vertical bolt 10. The lower transverse bar is formed integral with vertical sides 11, of an arch or support which is provided with a horizontal top connecting-bar 12. The support consists of a substantially rectangular frame, which is composed of the said sides or bars 11 and the top and bottom bars 12 and 5. The transverse bar 4, which is located above and spaced from the bar 5, has its terminals bent upwardly at right angles and secured to the inner faces of the sides 11 by bolts or other fastening devices. The spaced transverse bars 4 and 5 receive the rear ends of the central and transverse beams, as clearly shown in Fig. 1 of the drawings. The side beams 1 are provided at their rear portions with short bars or pieces 13, having their front ends bent at an angle and secured by bolts 14 or other suitable fastening devices to the side beams. The spacing blocks or pieces 15 and 16, which are interposed between the side beams and the rear longitudinal bars 13, are secured to the same by transverse bolts, as shown. The front blocks 15 receive bolts 17 for securing standards 18 to the main frame of the planter, and the rear blocks 16 are pierced by the bolts 19, which secure the side beams to the transverse bars 4 and 5. The standards 18 are provided with suitable cultivating blades or shovels 20; but instead of employing the standards 18 and the cultivating blades or shovels 20 covering-blades of any desired construction may be employed. Such covering-blades may be secured to the main frame at the short bars or pieces 13 by the transverse bolts, which pierce the front blocks or pieces 15. These cultivating-blades may be of any desired construction and may be secured to the rear portion of the main frame at the sides thereof in any suitable manner. The main frame is provided with inclined handle-bars 21, which are secured to the side beams near the front portions thereof and to the said arch or support, as clearly shown in Fig. 1 of the drawings.

A hopper 22 is detachably mounted on the main frame of the planter by means of front and rear bolts 23 and 24, which pierce a bed-plate 25, upon which the hopper is mounted. The front and rear bolts extend through the space between the central beams or bars 3 and engage clip-plates 26, which span the space between the bars 3 and engage the lower edges thereof. By removing the bolts 23 and 24 the bed-plate and the superimposed hopper may be detached to permit another form of hopper to be applied to the frame. The bed-plate is preferably constructed of wood, and the superimposed hopper is spaced therefrom by vertical posts or sleeves 27 and 28, located at the front and back of the hopper and preferably tapered inwardly at the ends similar to an ordinary spool and having central bores or openings for the reception of bolts 29 and 30. The bolts 29 and 30, which are provided at their lower ends with nuts, extend, respectively, through the bottom 31 of the hopper and through projecting ears 32. The ears 32, which are formed integral with the bottom 31 of the hopper, extend rearwardly therefrom, the bolts 29 being located at the front of the hopper, as clearly shown in Figs. 5 and 6. The hopper, which has an inclined front wall 33, is divided into two compartments 34 and 35 by a longitudinal partition 36. The partition 36 is provided at its front and back with angularly-bent flanges fitted against the front and rear walls of the hopper and suitably secured to the same. The bottom 31 of the hopper is provided with an upwardly-extending marginal rib or flange 37, arranged at the front, back, and sides and receiving the lower edges of the walls of the hopper. The body of the hopper is held against lateral and longitudinal movement by being arranged within the marginal flanges, and it is secured to the bottom by front and rear L-shaped plates 38 and 39, secured to the front and rear walls and having horizontal portions provided with perforations for the reception of the front and rear bolts 29 and 30.

The bottom 31 of the hopper is provided at opposite sides of the median line with circular depressions 40 and 41, forming seats or bearings for feed disks or wheels 42 and 43. The feed-disk 42 is provided at intervals with apertures 44, which may be of any desired size to suit the character of the seed to be planted and which are preferably circular, as shown. The other feed-disk 43 is provided with peripheral teeth 45, spaced apart to form recesses for the reception of fertilizer, which is discharged into a seed-spout 46 simultaneously with the discharge of the seed. The feed-disks are arranged on vertical shafts or spindles 47, on which are also mounted sleeves 48, having enlargements or flanges which fit against the upper faces of the feed-disks and which are provided with opposite lugs 49 for engaging perforations 50 of the said disks. The sleeves are fixed to the vertical shafts 47 by horizontal bolts 51, which pierce the sleeves and the shafts above the said enlargements or flanges. The seed-spout, which is secured to the upper face of the bed-plate, is interposed between the same and the hopper-bottom 31, which is provided with outlets 52 and 53, located above the spout 46. The rear wall of the hopper is provided with an exterior recess or cavity 54, formed by cutting away the rear wall above the bottom of the hopper and arranging plates 55 and 56 at the inner face of the said rear wall. The plates, which are located at opposite sides of the partition, have inclined top portions and angular side portions. Within the exterior cavity formed by the inwardly-extending plates is arranged a horizontally-disposed seed-ejecting lever 57, pivoted at its outer end by a rivet 58 or other suitable fastening device between a pair of perforated ears 59 and provided at its inner end with a spindle receiving a rotary disk or roller 60. The rotary disk or roller 60, which is retained on the spindle portion of the lever by a nut or other suitable fastening device, is located above the depression or bearing-recess 40 of the bottom of the hopper and is adapted to successively drop into the seed-openings of the feed-disk, whereby the contents thereof are positively ejected into the spout 46. The feed-disk 42 is engaged by a brush 61, suitably secured to the rear wall of the hopper by a bolt 62 and adapted to prevent the feed-disk from becoming clogged. A scraper-blade 63 is secured to the plate 56 by means of a bolt 64, which is arranged in a slot 65 of the said plate 56, whereby the scraper-blade is capable of adjustment with relation to the disk or wheel for feeding the fertilizer.

The bed-plate is provided with an opening 66, arranged beneath the tube or spout 46, and located above a seed tube or shoe 67, to which is secured a furrow-opening blade 68. The seed tube or shoe, which is provided with an opening or passage 69, is secured between the central bars or beams 3 by transverse bolts or other suitable fastening devices.

The lower ends of the vertical shafts or spindles 47 have keyed or otherwise secured to them horizontal gear-wheels 70, which mesh with vertical pinions 71 of a transverse shaft 72, journaled in suitable bearings 73 and carrying a sprocket-wheel 74. The sprocket-wheel 74 is located at one end of the shaft and is connected by a sprocket-chain 75 with a sprocket pinion or wheel 76 of a shaft or axle 77. The shaft or axle 77 is journaled in suitable bearings 78 and 79 and extends from opposite sides of a wheel 80, which supports the front of the planter. The wheel 80 is located between the front portions of the central bars or beams 3, and the bearings 78 and 79 are secured to the said bars or beams at the outer faces thereof. The front sprocket-wheel, which is slidably mounted on the shaft or axle 77, is yieldably held in engagement with a pin or key 81 by a coiled spring 82, located at the outer side of the sprocket-wheel and interposed between the same and a suitable stop 83. The hub of the front sprocket-wheel is provided at its inner end with notches 84, forming a clutch-face and adapted to receive the pin or key 81, whereby the sprocket-wheel is interlocked with the axle. Four notches are preferably provided, so that the parts will interlock quickly when free to do so.

The clutch is operated by means of a lever 85, fulcrumed between its ends on a bolt 86, which passes through a plate 87, secured to and extending laterally from the central longitudinal bars or beams 3, as clearly illustrated in Fig. 2 of the drawings. The lever preferably consists of a strip of metal doubled to form a front loop 88 for the reception of the hub of the front sprocket-wheel, and the rear portions 89 and 90 are spaced apart and are arranged between the transverse bars 4 and 5. The transverse bar 4 is provided with a shoulder 91, consisting of a block or piece bolted or otherwise secured to the lower face of the bar 4 and adapted to be engaged by the rear arm of the clutch-operating lever. The block or piece is preferably beveled at the outer side to enable the rear arm of the clutch-operating lever to be readily engaged with the shoulder by simply forcing the arm inwardly toward the center of the frame. The lever is held in engagement with the shoulder by means of a coiled spring 92, interposed between the portions 89 and 90 of the lever, as clearly shown in Fig. 1 of the drawings. The spaced bars 4 and 5 form guiding means for the expansible portions of the rear arm of the clutch-operating lever. When it is desired to throw the front sprocket-wheel into engagement with the pin or key of the shaft or axle 77, the upper portion 89 of the rear arm of the lever 85 is depressed by the toe of the person working the machine, and the spring 82 will swing the lever laterally. When the front sprocket-wheel is interlocked with the shaft or axle of the wheel 80, rotary motion is communicated from the said wheel 80 by the sprocket-gearing to the transverse shaft and by the gears 70 and 71 to the feed disks or wheels. The feeding mechanism may be readily thrown out of operation by the clutch-operating lever. When it is not desired to distribute fertilizer with the seed, a single hopper having only seed-feeding mechanism may be substituted for the double hopper shown. The hopper shown is designed for planting corn, peas, sorghum-seed, and the like, but a hopper of the usual construction for planting cotton may be substituted for that shown in the drawings.

Having thus fully described my invention, what I claim as new, and desire to secure by Letters Patent, is—

1. A planter of the class described, comprising a main frame provided with spaced central longitudinal beams, and having side beams also spaced from the central beam and connected with the same, a hopper mounted on the frame and provided with feed mechanism, a seed tube or shoe secured between and depending from the central beams, a wheel supporting the front of the frame and mounted between the central beams, and means for communicating motion from the wheel to the feed mechanism of the hopper.

2. In a planter, the combination of central longitudinal beams, side beams spaced from the central beams and having their front ends bent inwardly and secured to the same, an upstanding frame or support provided at the bottom with spaced transverse bars receiving the rear ends of the central and side beams, and handles secured to the side beams and to the sides of the upstanding frame or support.

3. In a planter, the combination of a main frame composed of central and side beams connected at their front ends, an upstanding frame or support connecting the rear ends of the central and side beams, handle-bars secured to the side beams and to the frame or support at opposite sides thereof, rear side bars or pieces secured to and arranged in spaced relation with the rear portions of the side beams, and spacing-blocks mounted between the side beams and the said bars or pieces.

4. In a planter, the combination of a main frame having spaced side beams, rear side bars arranged in spaced relation with the rear portions of the side beams and having their front ends secured to the same, spacing-blocks interposed between the side beams and the rear side bars or pieces, and transverse fastening devices piercing the said parts and securing the same together.

5. In a planter, the combination of a main frame having spaced central and side beams, a hopper provided with feed mechanism, a wheel supporting the front portion of the planter, gearing connecting the wheel with the feed mechanism of the hopper, said gearing located within the frame and having a clutch, a longitudinal lever arranged in one of the spaces between the central and side beams and fulcrumed between its ends on the frame and connected at its front portion with the clutch and adapted to be oscillated to throw the gearing out of operation, and means for locking the lever to hold the gearing out of operation.

6. In a planter, the combination of a main frame, a hopper having feed mechanism, gearing for operating the feed mechanism, said gearing including a clutch and a longitudinally-disposed laterally-movable clutch-operating lever provided with an expansible rear arm arranged to engage the frame for locking the lever against movement.

7. In a planter, the combination of a main frame having spaced bars, a hopper having feed mechanism, gearing for operating the feed mechanism of the hopper including a clutch, and a clutch-operating lever connected with the clutch and provided with an expansible arm arranged between the said spaced bars and engaging the same for holding the lever against movement.

8. In a planter, the combination of a main frame, a hopper having feed mechanism, gearing for operating the feed mechanism including a clutch, a clutch-operating lever fulcrumed between its ends and provided at one of its arms with expansible portions, a spring interposed between the expansible portions for forcing the same outward from each other, and a stop arranged to be engaged by the expansible portion of the lever.

9. In a planter, the combination of a main frame, a hopper having feed mechanism, gearing for operating the feed mechanism of the hopper including a clutch, a clutch-operating lever fulcrumed between its ends and provided at one arm with a loop to receive the clutch, the other arm of the lever being composed of spaced expansible portions, and guiding means receiving the spaced expansible portions of the lever and having a stop for engagement therewith.

10. In a planter, the combination of a main frame having central and side beams arranged in spaced relation, a bed-plate mounted on the central beams and having fastening devices extending between the same and engaging the lower edges thereof, a hopper mounted on the bed-plate, and a seed-tube secured to the central beams and located beneath the hopper and provided with furrow-opening means.

11. In a planter, the combination of a main frame, a bed-plate mounted on the main frame, a superimposed hopper mounted on and spaced from the bed-plate and having feed mechanism, and a seed-spout mounted on the bed-plate in the space between the same and the hopper.

12. In a planter, the combination of a main frame having central and side beams, a bed-plate mounted on the central beams, a superimposed hopper, posts mounted on the bed-plate and supporting the hopper in spaced relation with the same, a seed-spout interposed between the hopper, and the bed-plate, and a seed-tube mounted on the main frame and located beneath the spout.

13. In a planter, the combination of a main frame, a bed-plate mounted on the main frame, a superimposed hopper arranged in spaced relation with and mounted upon the bed-plate, feed disks or wheels located within the hopper, horizontal gears located beneath the hopper in the space between the same and the bed-plate and connected with the feed-disks, a transverse shaft arranged in the space between the hopper and the bed-plate and journaled in suitable bearings, pinions mounted on the transverse shaft and meshing with the said gears, and means for operating the transverse shaft.

14. In a planter, the combination of a frame, a hopper provided with a bottom having a marginal flange receiving the body portion of the hopper, interiorly-arranged plates secured to the body portion of the hopper and having horizontal projecting portions, posts supporting the hopper and located beneath the horizontal portions of the said plates, and fastening devices piercing the said plates and the posts and securing the hopper to the posts and connecting the body and the bottom together.

15. In a planter, the combination of a frame, a hopper having a detachable bottom provided with projecting ears, front and rear plates secured to the front and rear walls of the hopper and having projecting horizontal portions, the rear plates being arranged above the projecting ears of the bottom, and the front plates being located within the hopper, posts supporting the hopper and located beneath the said plates, and fastening devices piercing the plates and the posts and securing the hopper to the latter, and connecting the body and the bottom of the hopper.

In testimony that I claim the foregoing as my own I have hereto affixed my signature in the presence of two witnesses.

MARCUS PEARSON.

Witnesses:
C. J. PATTERSON,
W. E. HENRY.